Figure 1:
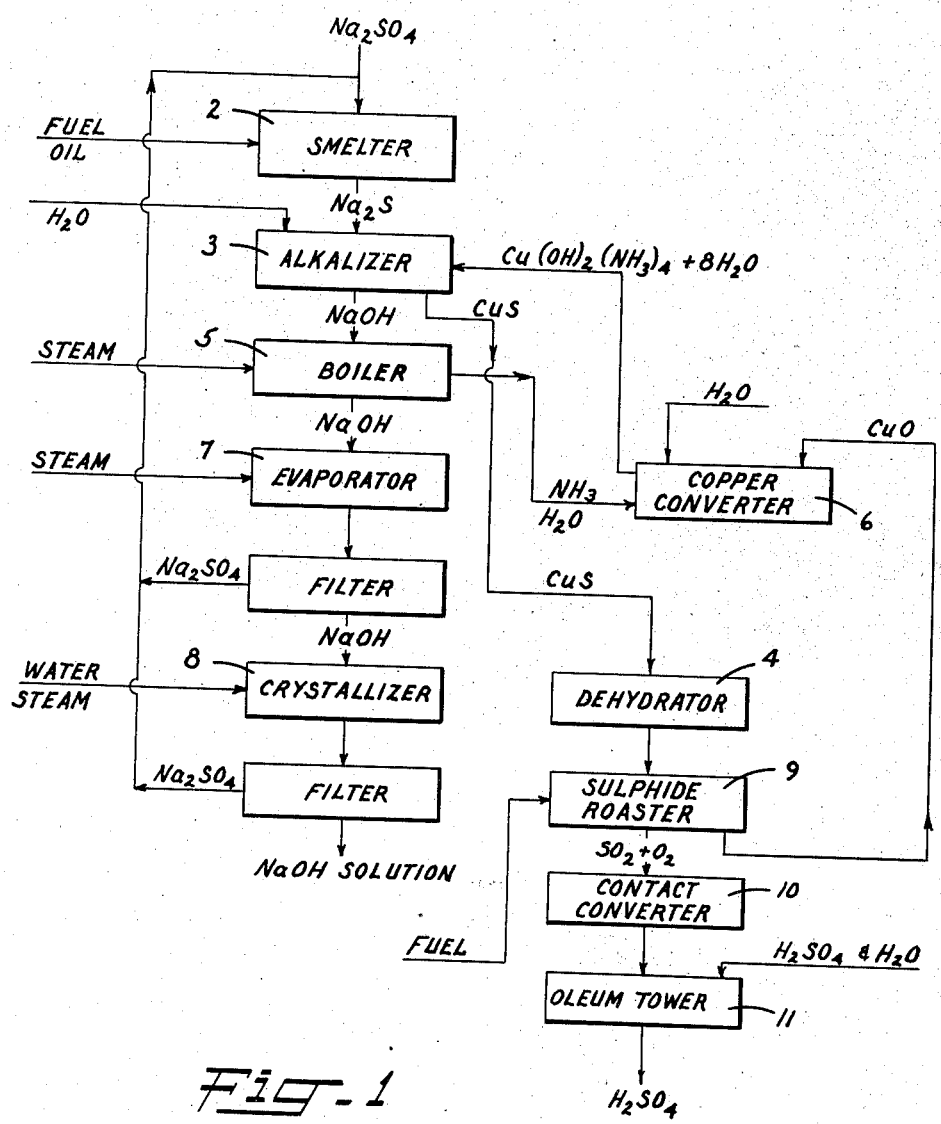

April 13, 1948. D. B. WICKER 2,439,404
PRODUCTION OF ALKALI METAL AND ALKALINE EARTH METAL HYDROXIDES
Filed Nov. 10, 1945 2 Sheets-Sheet 1

INVENTOR.
Dan B. Wicker
BY
Carl A. Castellan
atty.

INVENTOR.
Dan B. Wicker
BY Carl A. Castellan
atty.

Patented Apr. 13, 1948

2,439,404

UNITED STATES PATENT OFFICE 2,439,404

PRODUCTION OF ALKALI METAL AND ALKALINE EARTH METAL HYDROXIDES

Dan B. Wicker, Dunbar, W. Va., assignor to American Viscose Corporation, Wilmington, Del., a corporation of Delaware Application November 10, 1945, Serial No. 627,914

9 Claims. (Cl. 23—184)

This invention relates to a process for the production of hydroxides of alkali metal or alkaline earth metals from corresponding sulfides of alkali metal or alkaline earth metals. The invention comprises a novel combination of steps forming a cyclic process having important advantages in that it is economical and results in products which are usable in the form in which they are obtained. For instance, when the process is practiced in connection with sodium sulfide, the product is sodium hydroxide which may be directly used in the preparation of viscose. Sulfuric acid may also be obtained, as a by-product, and in a condition suitable for use in setting baths used in the manufacture of fibers or other articles from viscose in accordance with the wet spinning process.

Basically the process of my invention comprises, in combination, the steps of (a) reaction of the selected sulfide of an alkali metal or alkaline earth metal with the aqueous ammonium complex of a metal hydroxide to form an alkali metal hydroxide and precipitate the metal of the ammonium complex as sulfide, (b) recovery of aqueous ammonia from the reduction solution, (c) separation of the metal sulfide precipitated in step (a) and oxidation thereof to the metal oxide, (d) reaction of the metal oxide with aqueous ammonia from step (b) to re-form the aqueous ammonium complex of the metal hydroxide and return of the latter to step (a) for treatment of fresh quantities of the alkali metal or alkaline earth metal sulfide, and (e) concentration of the alkali metal or alkaline earth metal hydroxide solution remaining after separation of the metal sulfide and removal of the ammonia. Steps (b) and (c) may be carried out in either order or simultaneously if desired. Also, the oxide of sulfur obtained by oxidation of the metal sulfide separated from the alkali metal or alkaline earth metal hydroxide solution may be worked up in any way. For example, it may be further oxidized to sulfur trioxide and absorbed in a concentrated or dilute solution of sulfuric acid.

Metal ammonium complexes which are suitable for use in accordance with this invention are cuprammonium hydroxide, nickel ammonium hydroxide, cadmium ammonium hydroxide, cobalt ammonium hydroxide, silver ammonium hydroxide, zinc ammonium hydroxide, etc. Preferably, the metal is one having an oxide which does not form anions in the presence of alkali metal hydroxide solution and which is soluble in aqueous ammonia with formation of the metal hydroxide. The preferred metals are further characterized in that they form sulfides which are precipitated in the presence of aqueous ammonia and sodium hydroxide solution and which are oxidizable to sulfur dioxide or trioxide with regeneration of the ammonia-soluble metal oxide.

The accompanying drawings, in the nature of flow sheets, will illustrate the invention as applied to sodium sulfide and using the ammonium complex of copper. The sodium sulfide may be obtained by reduction of sodium sulfate by means of any suitable reducing agent such as carbon, hydrocarbons, natural or manufactured gas, etc. Usually the product so obtained is accompanied by comparatively small amounts of sodium sulfate which may be desirable, though not essential, since the sodium sulfate may function as a flux during the step of reduction to sodium sulfide. If the alkali metal sulfide is not accompanied by sodium sulfate, it may be admixed therewith, or with other agents which function as a flux, as, for instance, an alkali metal carbonate or hydroxide.

Referring to Fig. 1 of the drawing, sodium sulfate, which may be the excess salt removed from the acid spinning baths for viscose rayon manufactured, is introduced into a smelter 2, where it is reduced to sodium sulfide. The reduction product, which may comprise some sodium sulfate, is next led into an alkalizer 3, where it is reacted with, for example, cuprammonium hydroxide to produce sodium hydroxide and copper sulfide. The reaction proceeds as follows:

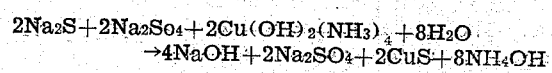

The copper sulfide is substantially insoluble in the sodium hydroxide solution and precipitates. It is separated from the supernatant liquid and forwarded to a dehydrator 4, the remaining solution being conducted to a boiler 5, into which steam is injected. Ammonia and water are volatilized, and the vapors are condensed and introduced into a converter 6. The residual aqueous slurry, comprising a mixture of sodium hydroxide and some sodium sulfate, is freed of a portion of the sodium sulfate by crystallization thereof in evaporator 7, fed with steam which supplies the heat required for the concentration, and the sodium sulfate is filtered off and returned for mixing with fresh sodium sulfate entering smelter 2. Remaining portions of the sodium sulfate are separated from the sodium hydroxide in crystallizer 8, filtered off and returned to smelter 2. The residue consists of a concentrated sodium hydroxide solution which is suitable for use, for example, in the preparation of viscose. Any traces of copper remaining in the solution may be precipitated by the addition of small amounts of such substances as glucose, hemi-cellulose or other reducing agents, prior to the step of evaporation. In those instances where sodium carbonate is present in admixture with the sodium hydroxide it may be removed by treating the mixture with calcined lime.

The copper sulfide dehydrator 4 is fed into a roaster 9, where it is oxidized to copper oxide and sulfur dioxide, the copper oxide being separated, and introduced into converter 6, where it reacts with the aqueous ammonia recovered from the sodium hydroxide solution, additional water being added, as required, to re-form cuprammonium hydroxide in accordance with the following equation:

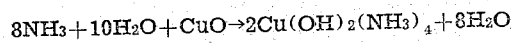

$8NH_3 + 10H_2O + CuO \rightarrow 2Cu(OH)_2(NH_3)_4 + 8H_2O$

The cuprammonium hydroxide thus obtained is returned to alkalizer 3. The sulfur dioxide is further oxidized to sulfur trioxide in contact converter 10, and the $SO_3$ is absorbed in concentrated sulfuric acid in a conventional type of absorption tower 11 to produce fuming sulfuric acid which, on dilution, is ready for use in setting baths such as are used in the rayon industry, or for any other purpose.

Oxidation of the sulfur dioxide to sulfur trioxide may be effected in the presence of any suitable catalyst which promotes the reaction between $SO_2$ and oxygen. The $SO_3$ gases issuing from the contact converter may be cooled, if desired, as by passage thereof through heat exchangers, to avoid decomposition back to $SO_2$ and oxygen, and to render the absorption of the $SO_3$ in sulfuric acid more efficient.

Figure 2:
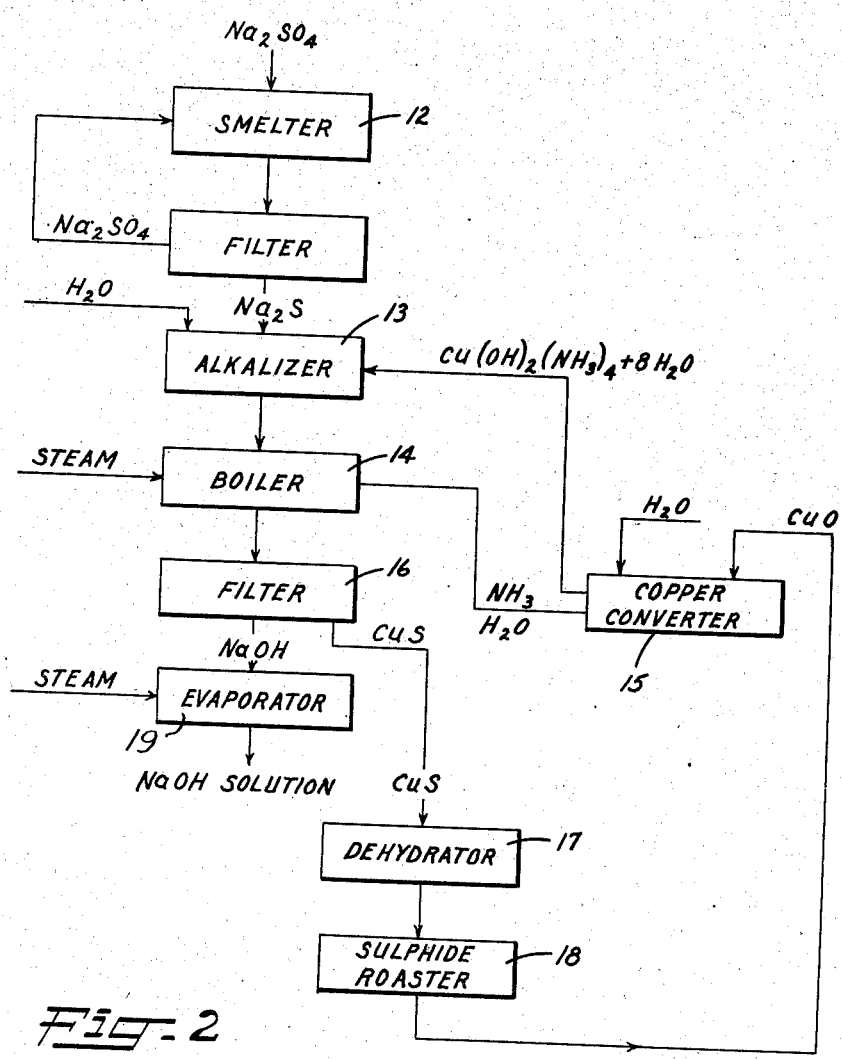

Referring now to Fig. 2, which illustrates a modification of the invention in which the steps of the process are carried out in a different order, the sodium sulfide, is obtained by reduction of sodium sulfate in the smelter 12. The product leaving the smelter, and which comprises some sodium sulfate, is filtered to separate the sulfate, after which it is introduced into the alkalizer 13, where it is treated with, for example, cuprammonium hydroxide, to produce sodium hydroxide and copper sulfide, after which it is forwarded to a boiler 14 into which steam is injected. Ammonia and water are volatilized and the vapors are condensed and introduced into a converter 15. The copper sulfide which settles out is filtered from the solution by means of filter 16, forwarded to a dehydrator 17 and then fed into a roaster 18 where it is oxidized to copper oxide and sulfur dioxide, the copper oxide being separated and sent to converter 15 for reaction with the aqueous ammonia previously recovered, to re-form cuprammonium hydroxide which is recycled to alkalizer 13. The residue from the copper sulfide separation comprises a sodium hydroxide solution, which may be concentrated in an evaporator 19.

Although the invention is of general application to sulfides of the alkali metal and alkaline earth metals as a class, it is of particular value for the conversion of sodium sulfide to a concentrated solution of sodium hydroxide and sulfuric acid, since by reduction of the sodium sulfate recovered from viscose setting baths, and treatment of the resultant sodium sulfide in accordance with the invention, an economical and valuable method is provided for disposing of the large amounts of sodium sulfate obtained as by-product in the rayon industry. The concentration of the sodium sulfate normally present as a constituent of such baths is continuously built up during spinning or casting procedures so that eventually the baths contain excessively large amounts of sodium sulfate, disposition of which usually entails either dispatch thereof to a waste disposal system or conversion of Glauber's salt to anhydrous sodium sulfate by methods requiring complicated evaporating devices with attendant difficulties due to incrustation of the evaporating surfaces by deposited salt crystals. The present invention provides a method for converting the sodium sulfate, through the corresponding sulfide, to products which are directly reuseable in the form obtained, in the manufacture of rayon fibers or other articles from viscose, thus effecting a substantial saving in the ultimate costs of rayon manufacture. The oxidation of the metal sulfide to the oxide, at one stage of the process, and reaction thereof with aqueous ammonia recovered at another stage, is a particularly valuable feature of the invention, since when the oxide and aqueous ammonia are reacted together as indicated by the equation set forth above, the aqueous ammonium complex of the metal hydroxide is reformed and is recirculated for reaction with fresh alkali metal or alkaline earth metal sulfide, the process being continuously operated with extremely small losses.

I claim:

1. A process for obtaining hydroxides of metals selected from the group consisting of alkali metals and alkaline earth metals from sulfides of the corresponding alkali metals and of the alkaline earth metals which comprises the step of reacting the selected sulfide with the aqueous ammonium complex of a metal hydroxide regenerated by reaction of water, ammonia and metallic oxide obtained from the product of reaction between sulfide and aqueous ammonium complex of the metal hydroxide at an earlier stage of the process.

2. A process for obtaining hydroxides of metals selected from the group consisting of alkali metals and alkaline earth metals from sulfides of the corresponding alkali metals and of the alkaline earth metals which comprises the step of reacting the selected sulfide with cuprammonium hydroxide regenerated by reaction of water, ammonia and copper oxide obtained from the product of reaction between sulfide and cuprammonium hydroxide at an earlier stage of the process.

3. A process for obtaining sodium hydroxide from sodium sulfide which comprises the step of reacting the sulfide with the aqueous ammonium complex of a metal hydroxide regenerated by reaction of water, ammonia and metallic oxide obtained from the product of reaction between sodium sulfide and the aqueous ammonium complex of the metal hydroxide at an earlier stage of the process.

4. A process for obtaining sodium hydroxide from sodium sulfide which comprises the step of reacting the sulfide with cuprammonium hydroxide regenerated by reaction of water, ammonia and copper oxide obtained from the product of reaction between sodium sulfide and cuprammonium hydroxide at an earlier stage of the process.

5. A cyclic method for obtaining hydroxides of metals selected from the group consisting of the alkali metals and alkaline earth metals from sulfides of the corresponding alkali metals and of the alkaline earth metals which comprises reacting the selected sulfide with the aqueous ammonium complex of a metal hydroxide to form a solution of the alkali metal or alkaline earth metal hydroxide and precipitate the metal of the ammonium complex in the form of its sulfide, separating the metal sulfide from the solution of the alkali metal or alkaline earth metal hydroxide, oxidizing the separated metal sulfide to the metal oxide, recovering aqueous ammonia from the hydroxide solution separated from the metal sulfide, reacting the metal oxide with the recovered aqueous ammonia to re-form the aqueous ammonium complex of the metal hydroxide, and recycling the latter for reaction with fresh alkali metal or alkaline earth metal sulfide.

6. A cyclic method for obtaining sodium hydroxide from sodium sulfide, which comprises reacting the sodium sulfide with the aqueous ammonium complex of a metal hydroxide to form a solution of sodium hydroxide and precipitate the metal of the ammonium complex in the form of its sulfide, separating the metal sulfide from the sodium hydroxide solution and oxidizing the metal sulfide to the metal oxide, recovering aqueous ammonia from the hydroxide solution separated from the metal sulfide, reacting the metal oxide with the recovered aqueous ammonia to re-form the aqueous ammonium complex of the metal hydroxide, and recycling the latter for reaction with fresh sodium sulfide.

7. A cyclic process for obtaining sodium hydroxide from sodium sulfide, which comprises reacting the sodium sulfide with cuprammonium hydroxide to form sodium hydroxide and precipitate copper sulfide, separating the copper sulfide from the sodium hydroxide solution and oxidizing the copper sulfide to copper oxide, recovering aqueous ammonia from the hydroxide solution separated from the copper sulfide, reacting the copper oxide with the recovered aqueous ammonia to re-form cuprammonium hydroxide, and recycling the latter for reaction with fresh sodium sulfide.

8. A cyclic process for obtaining hydroxides of metals of the group consisting of alkali metals and alkaline earth metals, from the sulfides of the corresponding alkali metals and of the alkaline earth metals, which comprises reacting the selected sulfide with the aqueous ammonium complex of a metal hydroxide to form a solution of the alkali metal or alkaline earth metal hydroxide and convert the metal of the aqueous ammonium complex to its sulfide, then separating the metal sulfide, subjecting the residue to a boil-off to vaporize ammonia and water therefrom and condensing the vapors, oxidizing the metal sulfide to the metal oxide, reacting the metal oxide with the recovered aqueous ammonia to re-form the aqueous ammonium complex of the metal hydroxide, and recycling the latter for reaction with fresh alkali metal or alkaline earth metal sulfide.

9. A cyclic process for obtaining hydroxides of metals selected from the group consisting of alkali metals and alkaline earth metals, from sulfides of the corresponding alkali metals and of the alkaline earth metals, which comprises reacting the selected sulfide with the aqueous ammonium complex of a metal hydroxide to form a solution of the alkali metal or alkaline earth metal hydroxide and convert the metal of the ammonium complex to its sulfide, then subjecting the reaction product to a boil-off to vaporize ammonia and water therefrom and condensing the vapors, then separating the metal sulfide and oxidizing it to the metal oxide, reacting the metal oxide with the recovered aqueous ammonia to re-form the aqueous ammonium complex of the metal hydroxide, and recycling the latter for reaction with fresh alkali metal or alkaline earth metal sulfide.

DAN B. WICKER.

REFERENCES CITED

The following references are of record in the file of this patent:

UNITED STATES PATENTS

| Number | Name | Date |
|---|---|---|
| 823,896 | Ranson | June 19, 1906 |
| 2,164,141 | Moore | June 27, 1939 |
| 2,145,815 | Morrow | Jan. 31, 1939 |
| 2,175,273 | Mertes | Oct. 10, 1939 |
| 2,173,912 | Mertes | Sept. 26, 1939 |

OTHER REFERENCES

"Inorganic and Theoretical Chemistry," by Mellor, vol. 3 (1923), page 151.

Certificate of Correction

Patent No. 2,439,404.                                                                                        April 13, 1948.

DAN B. WICKER

It is hereby certified that error appears in the printed specification of the above numbered patent requiring correction as follows: Column 3, line 13, after the word "sulfide" insert *leaving*; and that the said Letters Patent should be read with this correction therein that the same may conform to the record of the case in the Patent Office.

Signed and sealed this 15th day of June, A. D. 1948.

[SEAL]

THOMAS F. MURPHY,
*Assistant Commissioner of Patents.*